United States Patent
Heuser et al.

(10) Patent No.: US 10,562,655 B2
(45) Date of Patent: Feb. 18, 2020

(54) DEVICE FOR ALTERING THE JET SHAPE OF POURABLE PRODUCTS

(71) Applicant: SIG Technology AG, Neuhausen am Rheinfall (CH)

(72) Inventors: Richard Heuser, Herzogenrath (DE); Christian Rabe, Aachen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/301,014

(22) PCT Filed: Mar. 11, 2015

(86) PCT No.: PCT/EP2015/055020
§ 371 (c)(1),
(2) Date: Sep. 30, 2016

(87) PCT Pub. No.: WO2015/150032
PCT Pub. Date: Oct. 8, 2015

(65) Prior Publication Data
US 2017/0015452 A1    Jan. 19, 2017

(30) Foreign Application Priority Data
Mar. 31, 2014 (DE) .......... 10 2014 104 480

(51) Int. Cl.
*B65B 39/00* (2006.01)
*B65B 25/00* (2006.01)
(Continued)

(52) U.S. Cl.
CPC ............ *B65B 39/00* (2013.01); *B22F 3/1055* (2013.01); *B23K 26/342* (2015.10); *B28B 1/001* (2013.01);
(Continued)

(58) Field of Classification Search
CPC .. B65B 3/04; B65B 3/22; B65B 3/045; B65B 3/2608; B65B 39/00; B65B 2039/009
(Continued)

(56) References Cited

U.S. PATENT DOCUMENTS 923,835 A * 6/1909 Hart .................. F23D 14/40
138/37
2,805,889 A * 9/1957 Terry .................. B05B 3/06
239/259
(Continued)

FOREIGN PATENT DOCUMENTS

AT          23832 B      3/1987
CA       1290974 C     10/1991
(Continued)

*Primary Examiner* — Timothy L Maust
(74) *Attorney, Agent, or Firm* — The Webb Law Firm

(57) ABSTRACT

A device is illustrated and described for altering the jet shape of pourable products, in particular of foodstuffs, including an entry region for the entry of the pourable products, an exit region for the exit of the pourable products, and several ducts for conveying the pourable products, wherein each duct has at least one inlet associated with the entry region and at least one outlet associated with the exit region. The use of this device for the filling of foodstuffs and a method for the production of this device are also illustrated and described. In order to achieve that the shape and the velocity profile of the filling jet can be adjusted simply and gently, it is proposed that at least one of the ducts is curved, at least in sections.

5 Claims, 6 Drawing Sheets

(51) Int. Cl.
  *B65B 3/04* (2006.01)
  *B65B 3/22* (2006.01)
  *B67C 3/26* (2006.01)
  *B33Y 10/00* (2015.01)
  *B33Y 80/00* (2015.01)
  *B23K 26/342* (2014.01)
  *B22F 3/105* (2006.01)
  *B28B 1/00* (2006.01)
  *C22C 14/00* (2006.01)
  *C22C 21/02* (2006.01)
  *B23K 101/04* (2006.01)
  *B23K 103/04* (2006.01)
  *B23K 103/08* (2006.01)
  *B23K 103/10* (2006.01)
  *B23K 103/14* (2006.01)
  *B29K 71/00* (2006.01)

(52) U.S. Cl.
  CPC .............. *B33Y 10/00* (2014.12); *B33Y 80/00* (2014.12); *B65B 3/04* (2013.01); *B65B 3/22* (2013.01); *B65B 25/001* (2013.01); *B67C 3/2608* (2013.01); *C22C 14/00* (2013.01); *C22C 21/02* (2013.01); *B22F 2302/45* (2013.01); *B23K 2101/04* (2018.08); *B23K 2103/04* (2018.08); *B23K 2103/08* (2018.08); *B23K 2103/10* (2018.08); *B23K 2103/14* (2018.08); *B29K 2071/00* (2013.01); *B65B 2039/009* (2013.01); *B67C 2003/2671* (2013.01)

(58) Field of Classification Search
  USPC ...... 141/237, 311 A; 222/485; 239/436, 561, 239/565
  See application file for complete search history.

(56) References Cited

U.S. PATENT DOCUMENTS

| | | | | |
|---|---|---|---|---|
| 3,246,850 A | * | 4/1966 | Bourke | B05B 1/16 222/557 |
| 3,324,905 A | * | 6/1967 | Paulo | A23G 9/282 141/100 |
| 3,423,029 A | * | 1/1969 | Demaison | B05B 1/14 239/565 |
| 3,698,452 A | | 10/1972 | Waxlax | |
| 3,913,845 A | | 10/1975 | Tsuji | |
| 4,512,379 A | | 4/1985 | Hennig | |
| 4,824,024 A | * | 4/1989 | Bishop | B05B 1/14 239/171 |
| 5,168,905 A | * | 12/1992 | Phallen | B65B 3/36 141/1 |
| 5,381,839 A | * | 1/1995 | Dowd | B65B 3/30 141/237 |
| 5,505,337 A | * | 4/1996 | Littman | B65D 35/38 222/185.1 |
| 5,865,221 A | | 2/1999 | Ludwig et al. | |
| 6,076,750 A | | 6/2000 | Mykkanen et al. | |
| 6,945,266 B2 | * | 9/2005 | de Tezanos Pinto | F15D 1/04 137/14 |
| 9,456,884 B2 | * | 10/2016 | Uckelmann | B29C 67/0007 |
| 2001/0031303 A1 | | 10/2001 | Buter et al. | |
| 2003/0121934 A1 | | 7/2003 | Taylor-McCune et al. | |
| 2010/0024910 A1 | | 2/2010 | Nakamori et al. | |
| 2011/0057056 A1 | | 3/2011 | Ziminsky et al. | |
| 2015/0037453 A1 | | 2/2015 | Albrecht et al. | |
| 2015/0211462 A1 | * | 7/2015 | Schnobrich | F02M 61/184 239/589 |

FOREIGN PATENT DOCUMENTS

| | | | | |
|---|---|---|---|---|
| CN | 103008398 B | 9/2016 | | |
| DE | 2354268 | 7/1974 | | |
| DE | 2601421 B1 | 3/1977 | | |
| DE | 102004029679 A1 | 12/2005 | | |
| DE | 102004055327 A1 | 5/2006 | | |
| DE | 102010017623 A1 | 3/2011 | | |
| DE | 102012203506 A1 | 9/2013 | | |
| EP | 0919472 A1 | 6/1999 | | |
| EP | 1657159 A1 | * | 5/2006 | ............ B65B 3/326 |
| EP | 1908855 A1 | 4/2008 | | |
| EP | 2078678 A1 | 7/2009 | | |
| EP | 2479113 A1 | 7/2012 | | |
| JP | 826220 A | 1/1996 | | |
| JP | 2000237637 A | 9/2000 | | |
| JP | 20058177 A | 1/2005 | | |
| JP | 2008542157 A | 11/2008 | | |
| JP | 201235890 A | 2/2012 | | |
| WO | 9526906 A1 | 10/1995 | | |
| WO | 0180662 A1 | 11/2001 | | |
| WO | 0189707 A1 | 11/2001 | | |
| WO | 2013064299 A1 | 5/2013 | | |

\* cited by examiner

DEVICE FOR ALTERING THE JET SHAPE OF POURABLE PRODUCTS

CROSS-REFERENCE TO RELATED APPLICATIONS

This application is the United States national phase of International Application No. PCT/EP2015/055020 filed Mar. 11, 2015, and claims priority to German Patent Application No. 10 2014 104 480.0 filed Mar. 31, 2014, the disclosures of which are hereby incorporated in their entirety by reference.

BACKGROUND OF THE INVENTION

Field of the Invention

The invention relates to a device for altering the jet shape of pourable products, in particular of foodstuffs, comprising an entry region for the entry of the pourable products, an exit region for the exit of the pourable products, and several ducts for the conveying of the pourable products, wherein each duct has at least one inlet associated with the entry region and at least one outlet associated with the exit region.

The invention additionally relates to the use of such a device for filling foodstuffs, in particular for the aseptic filling of foodstuffs.

Finally, the invention relates to a method for the production of such a device.

Description of Related Art

In the field of packaging technology, numerous possibilities are known for filling pourable products into the packages provided for these. The pourable products can be, for example, foodstuffs such as for instance milk, fruit juice, sauces or yogurt. Composite packages with layers of cardboard and plastic can be used for example as packages.

An important stage in the filling of packages consists in filling the pourable products into the packages as quickly as possible, in order to be able to achieve a quick cycle time and therefore high numbers of units. Despite the high flow speed, however, the filling is to take place largely without splashes and the formation of foam, in order to be able to fulfil the hygienic requirements and to prevent contaminations on the packaging or on the filling machine.

Particularly high hygienic requirements occur in the case of foodstuffs which are filled under sterile, i.e. germfree conditions.

The high requirements can only be met when the filling process is adapted to individual factors, such as for example the characteristics of the product which is to be filled and the volume and the form of the packaging. The adaptation regularly includes an adjustment of the through-flow quantity and the through-flow speed. Furthermore, often also the filling nozzle is adapted to the product which is to be filled, and the packaging, and is replaced if necessary. This is because the filling nozzle significantly determines the shape and the velocity profile of the filling jet. In addition, the filling nozzle is responsible for a drip-free filling. For this, the volume flow before the exit from the filling nozzle is frequently divided into several partial flows, which are directed through individual ducts. This has the advantage that the product which is to be filled comes in contact with a greater wall surface, whereby in the case of an interruption of the filling the residual quantity of the product which is to be filled is reliably held in the ducts and does not drip in an uncontrolled manner onto the packaging or onto the filling machine ("capillary action").

From the field of sanitary engineering, numerous devices are known for altering the shape of water jets. Such devices are also known under the designation "jet regulators" and are usually mounted at the water outlet of a water tap. The known jet regulators frequently have several wire grids arranged one behind the other, which are also designated as "screens". In addition, several jet regulators have several perforated inserts, for example perforated metal sheets, arranged one behind the other. The water is directed through the screens and inserts in order to influence the characteristics of the water jet. Such jet regulators from the field of sanitary engineering are described for example in DE 30 00 799 A1 or WO 01/94707 A1.

However, the solutions from the field of sanitary engineering are not regularly transferable to the field of food technology. This lies firstly in the fact that all the solutions known from the field of sanitary engineering are directed to water as the flow medium. Foodstuffs such as milk or fruit juice, however, have a different viscosity to water and possibly even have fragmentary components such as fruit pulp. A further difference lies in that jet regulators from the field of sanitary engineering are designed with regard to the requirements of end-consumers and in particular also are to influence characteristics of water jets which are to be assessed purely subjectively (flow noise, feel of the water jet, etc.). In addition, the water which is removed is used immediately, so that a small pollution with microorganisms is tolerable for the human body. However, if the foodstuff is to be stored over a lengthy period of time of several days, weeks or even months, and possibly without refrigeration, the hygienic requirements placed on the jet regulators known from sanitary engineering are not sufficient. Jet regulators from the field of sanitary engineering are therefore unsuitable in most cases for the filling of foodstuffs.

Devices for altering the jet shape of pourable products are also known from the field of the filling of foodstuffs. From DE 26 01 421 B1 for example a mouthpiece of a tapping point for milk is known. The mouthpiece comprises a round pipe piece, at the lower edge of which a collar is provided. On the collar a perforated plate is arranged, on which a sheet of an open-pored foam material lies. The foam material has a particularly large surface and makes provision that the milk which is to be filled does not drip in the case of an interruption to the filling. A comparable nozzle with a side wall of a porous material is known from U.S. Pat. No. 3,698,452 A.

The use of porous materials such as foam material has the advantage of a very large contact surface between the liquid which is to be filled and the foam material. Through the large contact surface, owing to the capillary action an undesired drop formation is prevented. However, the use of foam materials also has disadvantages. Firstly, foam materials are able to be cleaned very poorly, so that the hygienic requirements can only be fulfilled by the constant replacement of the foam material sheets. Also, the use of wire grids or screens is hygienically questionable, because they have numerous sites which are difficult to clean. In addition, foam materials, grids or screens have no defined geometry, so that a targeted influencing of the flow direction and/or flow speed of individual partial streams does not appear possible.

A further filling nozzle for the filling of foodstuffs is known for example from EP 2 078 678 A1. For the division of the volume flow, the filling nozzle shown there has an exchangeable plate with numerous holes. The holes are shaped cylindrically and run parallel to one another, in order to produce a particularly straight filling jet with the plate ("flow straightening plate"). Whereas the inlets of the holes lie in a plane, the outlets of holes are arranged on a curved surface, so that the holes viewed in the flow direction—are of different length. The speed of flow is to be influenced by the variation of the length of the holes. In particular, the speed of flow in the center of the filling jet is to be slowed down more intensively by longer holes and the higher friction caused thereby than in the peripheral regions of the filling jet.

The filling nozzle known from EP 2 078 678 A1 also has several disadvantages. Firstly, owing to the two-part construction, the plate must be sealed with respect to the body of the filling nozzle. In the gap which is to be sealed between the plate and the body, product residues can accumulate, which is problematic with regard to hygiene. A further disadvantage lies in the different length of the holes. This is because a curved outlet region of the plate leads to the partial flows of the product which is to be filled releasing themselves from the underside of the plate at different moments, and in addition being exposed to a differently sized drop height to the bottom of the packaging. The partial flows which are directed through shorter holes and release themselves earlier from the underside of the plate are exposed earlier to a gravitational acceleration than the partial flows which are still situated in the longer holes at this point in time. Owing to the different drop heights of the partial flows, these are also accelerated at different lengths in free fall and achieve a differently great increase in speed. This has the result that the velocity profile set at the underside is altered again in free fall. The significant velocity profile for splash formation on impact of the filling jet onto the bottom of the packaging can therefore only be set very imprecisely by the proposed solution.

SUMMARY OF THE INVENTION

The invention is therefore based on the problem of configuring and further developing the device, named in the introduction and previously described in further detail, such that the shape and the velocity profile of the filling jet can be adjusted simply and gently.

This problem is solved in a device according to the preamble of claim 1 in that at least one of the ducts is curved, at least in sections.

The device according to the invention is firstly distinguished by an entry region for the entry of the pourable products and by an exit region for the exit of the pourable products. Between the entry region and the exit region, several ducts are arranged for the conveying of the pourable products. Each of the ducts has at least one inlet which is associated with the entry region. In addition, each of the ducts has at least one outlet, which is associated with the exit region. Preferably, each of the ducts has just one inlet which is associated with the entry region and has in addition just one outlet which is associated with the exit region. Alternatively, an arm of a duct can also be divided into two or more arms, so that this duct in fact has only one inlet, but two or more outlets. Likewise, two or more arms can unite to one arm, so that this duct has several inlets, but only one outlet. The ducts can therefore have branches.

The ducts can be divided into a central duct and into one or more eccentric ducts. A central duct is understood to mean a duct which intersects the center axis of the device at least in sections, in particular, however, lies along its entire length on the center axis of the device. An eccentric duct, on the other hand, is understood to mean a duct which does not intersect the center axis of the device at any point. According to the requirement of the filling material which is to be filled, the ducts can have round, oval or polygonal cross-sectional areas.

By at least one of the ducts being curved at least in sections according to the invention, the flow direction of the partial flow flowing through this duct can be altered particularly simply. In addition, the partial flow through a curved duct can be deflected particularly uniformly and therefore in a gentle manner with regard to the product from a vertical direction into a direction which is inclined with respect to the center axis. The duct which is curved in sections can be the central duct and/or one or more of the eccentric ducts. A curvature is understood to mean—in accordance with mathematical understanding—the deviation of a curve/surface from a straight line/plane. The edge of a circle is curved, for example, for which reason the extent of a curvature is also designated as a "curvature radius" (intensive curvature=small curvature radius and vice versa). A curvature is to be differentiated from an inclination: When the course of a duct is described as a mathematical function, the first derivation represents its inclination and the second derivation represents its curvature. A mathematical function is therefore "curved" in the regions in which its second derivation is unequal to zero. The curvature of the ducts can be constant (as in a circle or a spiral) or can change (as in an oval). The curvature can be directed inwards—i.e. to the center axis—or outwards. Alternatively hereto, the curvature can result from a spiral-shaped configuration of the ducts, so that the duct or ducts run helically in a single-start or multi-start manner from the entry region to the exit region. The sign of the curvature can remain the same or can change (from "left curve" to "right curve"). The device can be produced from metal, in particular high-grade steel, plastic, in particular PEEK (polyetheretherketone) or from ceramic.

According to a further development of the invention, provision is made that all eccentric ducts are curved at least in sections. The advantages of a curved duct are particularly great if not only some, but all eccentric ducts are curved at least in sections. In so far as a central duct is also present, this duct can also be curved at least in sections, so that all ducts are curved at least in sections.

A further teaching of the invention makes provision that at least one of the ducts is continuously curved. A continuous curvature is understood to mean a curvature which extends over the entire length of the duct—i.e. from its inlet or its inlets to its outlet or its outlets. Through the use of the entire length of the ducts, the amount of curvature or radius of curvature necessary for achieving a desired change of the flow direction can be reduced. This has the advantage of a particularly gentle deflection of the flow. The continuously curved duct can be the central duct and/or one or more of the eccentric ducts.

According to an embodiment of the invention, provision is made that all eccentric ducts are continuously curved. The advantages of a continuously curved duct are particularly great when not only some, but all eccentric ducts are continuously curved.

In so far as a central duct is also present, this duct can also be continuously curved, so that all the ducts are continuously curved.

In further embodiment of the invention, it is proposed that the wall surfaces of the ducts are constructed in one piece. Through a one-piece construction of the wall surfaces, in particular continuous, smooth wall surfaces can be achieved.

This has the advantage of a low flow resistance. In addition, ducts with smooth wall surfaces can be cleaned particularly simply and effectively, so that also strict hygiene requirements can be fulfilled. Ducts with one-piece wall surfaces therefore have several advantages compared with wall surfaces with a geometrically undefined surface (e.g. foamed materials) or compared with multi-part wall surfaces with edges and steps (e.g. several perforated plates arranged one behind the other). In the case of ducts which are dividing or uniting, the wall surfaces are preferably also constructed in one piece in the regions of the branches. A one-piece construction of the wall surfaces of the ducts can be achieved for example in that the device is constructed in one piece either in the region of the ducts or as a whole. This can be achieved for instance by additive manufacturing methods.

According to an embodiment of the invention, the device has a multi-part housing. Through the multi-part structure, different manufacturing methods can be used and combined, which permits a particularly cost-efficient production. For example, the part of the housing in which the curved ducts are arranged can be produced by an additive manufacturing method (e.g. laser melting), whilst the remaining parts of the housing are produced by conventional manufacturing methods (e.g. casting methods). A further reduction of the manufacturing costs can be achieved by the materials which are used also being adapted to with the (minimum) requirements of the different production methods.

A further development of the invention makes provision that the inlets and/or the outlets of the ducts are arranged in a plane. The arrangement of the inlets in a plane has the advantage that all inlets can be simultaneously reliably sealed by a particularly simply shaped, in particular by a flat, sealing element. In addition to a simple cleaning, the arrangement of the outlets in a plane has the advantage that all the partial flows release themselves simultaneously from the underside of the device and therefore are exposed simultaneously to the gravitational acceleration. Preferably, the plane in which the inlets of the ducts are arranged is parallel to the plane in which the outlets of the ducts are arranged. This has the advantage—in any case with similarly curved ducts—that the ducts are of equal length and therefore the deceleration of the partial flows in all ducts, caused by friction, is approximately of equal extent. Alternatively hereto, the plane in which the outlets of the ducts are arranged can be inclined with respect to the plane in which the inlets of the ducts are arranged. Hereby, in connection with correspondingly curved ducts, an intensive lateral alignment of the filling jet can be achieved.

According to an embodiment of the invention, provision is made that the number of ducts is at least 5 and in particular lies in the range between 10 and 100. According to this embodiment, the overall flow is to be divided into a particularly high number of partial flows. This has the advantage that for each partial flow, the speed and direction of this partial flow can be adjusted individually, so that also complex shapes and velocity profiles of the filling jet can be achieved. In addition, a high number of ducts leads to a greater contact surface between flow and duct, which owing to the capillary action reduces the risk of dripping when the filling is interrupted.

An embodiment of the invention is distinguished in that the sum of the inlets of a duct form a first cross-sectional area and the sum of the outlets of a duct form a second cross-sectional area, and that the second cross-sectional area of at least one duct is greater than the first cross-sectional area of this duct. Preferably, the second cross-sectional area of each duct is greater than the first cross-sectional area of this duct. In other words, the cross-sectional area of the ducts increases in the flow direction, i.e. from the inlet or the inlets in the direction of the outlet or the outlets. The increase of the cross-sectional area can take place uniformly and constantly or monotonically. Alternatively, the size of the cross-sectional area can also firstly decrease, but then increase beyond the initial size. Such a complex geometry can be achieved for example through additive manufacturing methods. According to the laws of fluid mechanics, in particular Bernoulli's Law, an increase of the cross-sectional area leads to a proportional decrease of the flow velocity. The described construction of the ducts accordingly leads to a deceleration of the partial flow flowing in the duct. The quotient of the first cross-sectional area and of the second cross-sectional area is therefore always smaller than one and represents a measurement for the extent of deceleration. This quotient can therefore also be designated as "deceleration factor"; its reciprocal, on the other hand, can be designated as "acceleration factor".

The quotient of the sum of the first cross-sectional areas of all ducts and of the sum of the second cross-sectional areas of all ducts can lie in the range between 0.35 and 0.75. This means that the entire cross-sectional area at the inlet of the ducts is only approximately 35% to 75% of the entire cross-sectional area at the outlet of the ducts. Therefore, a distinct increase of the entire cross-sectional area takes place in flow direction and therefore a deceleration of the entire flow.

Alternatively or additionally, the quotient of the first cross-sectional area and of the second cross-sectional area in the case of each duct can lie in the range between 0.35 and 0.75. This means that not only the sum of the cross-sectional areas, but the cross-sectional area at the inlet or at the inlets of each individual duct is only approximately 35% to 75% of the cross-sectional area at the outlet or at the outlets of this duct. Each individual duct is accordingly to contribute to distinct increase of the cross-sectional area and deceleration following therefrom, which lies within the said range. Provision can be made that the quotient of the first cross-sectional area and of the second cross-sectional area—i.e. the deceleration factor—is identical in the case of each duct; alternatively, the quotients can also vary between the ducts within the said range, so that the deceleration of the flow can be adapted individually for each duct.

In further embodiment of the invention, it is proposed that the center axes of the eccentric ducts are arranged inclined by an inclination angle with respect to the center axis of the device. The center axis of a duct is understood to mean a connecting line between the inlet or respectively the inlets and the outlet or respectively the outlets of the same duct; owing to the curvature of the ducts, this connecting line does not imperatively have to run continuously within the duct. Through the inclination of the eccentric ducts, the partial flows in these ducts can also receive a horizontal impulse in addition to a vertical impulse. This permits a particularly variable configuration of the shape of the filling jet. The ducts concerned can be inclined—viewed in the flow direction—outwards or inwards. An inclination outwards spreads or divides the filling jet and directs it laterally onto the walls of the packaging. In this way, the packaging is filled particularly gently and largely without the formation of foam. An inclination inwards, on the other hand, enables a particularly pointed, concentrated filling jet. The inclination angle can lie in the range between 1° and 30°. The inclination angle is the angle which occurs between the center axis of the device and the center axis of the corresponding duct.

The indicated range can again concern an inclination outwards or an inclination inwards. Preferably, the inclination angle with an inwardly directed inclination is between 1° and 6°, and with an outwardly directed inclination is between 5° and 15°.

According to an embodiment of the invention, provision is made that at least one duct has at least one branch. A branch is understood to mean that an arm of a duct is divided into two or more arms or that two or more arms are united to one arm. Both the central duct and also the eccentric ducts can have one or more branches. In the case of a duct with branches, the danger exists that the flows influence each other reciprocally in the different arms of the duct (communicating vessels principle). In the case of a duct with several outlets, this can lead to a running on of the filling material or to a partial emptying of the duct. By the branch being provided at a defined height—for example in the lower third of the housing —, however, a controlled partial emptying of the duct can be achieved, which prevents blockages by fragmentary particles. By branches, in addition, a particularly flexible adjustment of the shape and of the velocity profile of the filling jet can be achieved.

The device described above can be used in all illustrated embodiments particularly well for the filling of foodstuffs, in particular for the aseptic filling of foodstuffs. The foodstuffs can be, for example, milk, fruit juice, sauces or yogurt.

The problem described in the introduction is also solved by a method for the production of a device according to one of claims 1 to 11, wherein the method comprises the following step: a) producing the device with the ducts arranged therein by a additive manufacturing method.

According to prevailing opinion, additive or "generative" manufacturing methods belong to the "Primary forming manufacturing methods" (Main Group 1 according to DIN 8580). However, there are also similarities to the "Coating" manufacturing method (Main Group 5 according to DIN 8580). In additive manufacturing methods, the manufacture of components takes place on the basis of formless starting materials (e.g. liquids, pastes or powder) or neutral form starting materials (bands, wires, plates, films), which are shaped by chemical and/or physical processes. These processes can be, for example, melting and solidifying, bonding by binding agents or polymerisation. Compared with conventional methods, additive manufacturing methods offer considerable advantages with regard to the geometric configuration of the components. For example, through generative manufacturing methods, undercuts and complex structures can be produced in the interior of the component, which are only able to be produced with considerable effort or not able to be produced at all by conventional manufacturing methods. A further advantage lies in that tools and moulds—such as are necessary for instance in casting—are dispensed with. Additive manufacturing methods are indeed time-consuming and are therefore rather not suited for series production (typical composition rates are a few $cm^3$ per hour). Nevertheless, individual pieces or small series of components even with extraordinarily complex geometry can be produced without difficulty. In the production of the device described above, additive manufacturing methods excel in particular in the production of the complex geometry of the curved ducts. In known devices of this type, the ducts are usually bored or cut by wire eroding; however, these manufacturing methods do not permit the curved configuration of the ducts according to the invention. Components of metal or plastic can be produced with additive manufacturing methods. The methods of sintering or melting, described below, present themselves for the processing of metals. On the other hand, the so-called "3D printing" can be used for the processing of plastics, in which physical or chemical melting and hardening processes are used for the configuration of the component. The plastic PEEK (polyetheretherketone) has proved to be particularly suited for use in the food industry owing to its high stability, its temperature resistance and its high abrasion resistance.

An embodiment of the method makes provision that step a) takes place by sintering or melting. In sintering or melting, the starting material, for example a metal powder, is applied in layers and melted. The energy necessary for this can be supplied by beams, in particular laser beams, infrared beams or electron beams.

According to an embodiment of the invention, it is proposed that step a) takes place by laser sintering or laser melting. In laser sintering or in laser melting, in particular in selective laser melting (SLM), the starting material, for example a metal powder, is applied in layers and melted by a laser beam. Through this procedure, very complex geometries can be produced.

Nickel-based alloys (e.g. Inconel 625, Inconel 718, Inconel HX), tool- and high-grade steel alloys (e.g. material numbers 1.2083, 1.2709, 1.4404, 1.2343), pure titanium or titanium alloys (e.g.: TiAl7Nb7, TiAl6V4), aluminium alloys (e.g. AlSi12, AlSi10Mg, AlSi7Mg, AlSi9Cu3) or cobalt-chrome alloys (e.g. CoCr ASTM F75) have proved to be suitable materials. The particularly suitable high-grade steel alloy 1.4404 is also known under the designation X2CrNiMo17-12-2 (DIN EN 10 027-1). As laser, for example an Nd:YAG laser ("Neodymium-doped Yttrium-Aluminium-Garnet Laser") with a laser beam diameter of 35 μm to 70 μm and with a laser output of at least 160 W, in particular at least 200 W, can be used. The applied layers can have a thickness in the range between 20 μm and 100 μm. The intensity of the laser beam is preferably at least $5 \times 10^{10}$ W/m². For the exposure time of the laser beam, values of at least 85 μs, in particular at least 130 μs, have proved suitable.

BRIEF DESCRIPTION OF THE DRAWINGS

The invention is explained in further detail below with the aid of a drawing illustrating merely a preferred example embodiment. In the drawing there are shown.

DESCRIPTION OF THE INVENTION

Figure 1A:
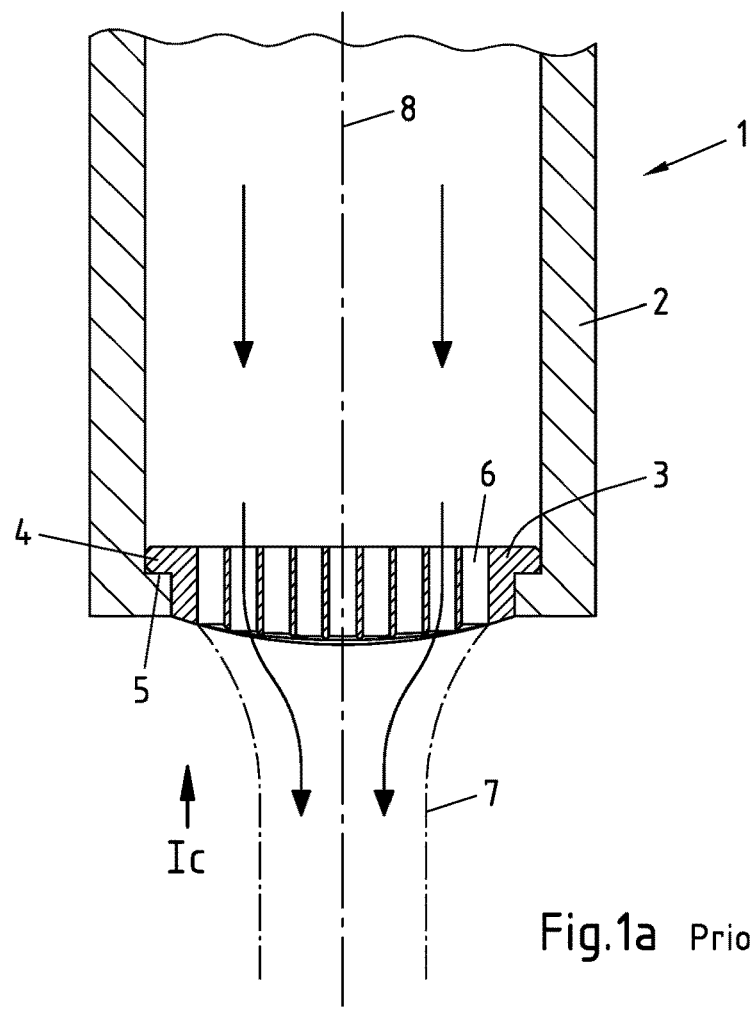
FIG. 1a a filling nozzle known from the prior art, in cross-section.

In FIG. 1 a filling nozzle 1 known from the prior art is illustrated in cross-section. The filling nozzle 1 comprises a body 2 and a plate 3 for shaping the flow. The plate 3 can be inserted exchangeably into the body 2, by a circumferential flange 4, which is provided on the plate 3, being placed onto a projection 5 which is provided on the body 2. The plate 3 has several holes 6 which permit a through-flow—illustrated diagrammatically in FIG. 1a by arrows—of the filling nozzle 1 with pourable products. After the exit from the filling nozzle 1, the pourable products form a jet 7, the outer contour of which is shown in FIG. 1. A center axis 8 runs centrally through the body 2 and the plate 3.

Figure 1B:
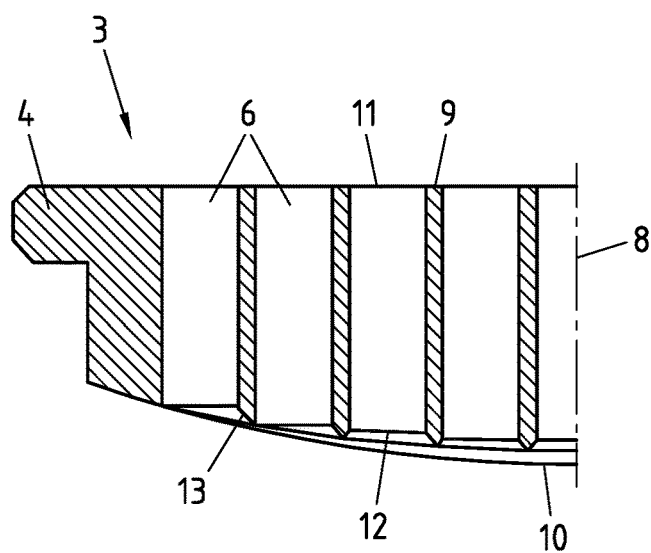
FIG. 1b an enlarged cut-out of the plate of the filling nozzle of FIG. 1a, in cross-section, FIG. 1c the plate of the filling nozzle of FIG. 1a along the section plane Ic-Ic drawn in FIG. 1a, FIG. 2 a first embodiment of a device according to the invention for altering the jet shape of pourable products, FIG. 3 a second embodiment of a device according to the invention for altering the jet shape of pourable products, FIG. 4 a third embodiment of a device according to the invention for altering the jet shape of pourable products, FIG. 5 a fourth embodiment of a device according to the invention for altering the jet shape of pourable products, and FIG. 6 a fifth embodiment of a device according to the invention for altering the jet shape of pourable products.

FIG. 1b shows an enlarged cut-out of the plate 3 of the filling nozzle 1 of FIG. 1a in cross-section. The regions of the plate 3 already described in connection with FIG. 1a are given corresponding reference numbers in FIG. 1b. The plate 3 has an upper side 9 for the entry of the pourable products and an underside 10 for the exit of the pourable products. The upper side 9 is connected with the underside 10 through the holes 6. Each of the holes 6 has an inlet 11 and an outlet 12, wherein the inlets 11 of the holes 6 are associated with the upper side 9 and wherein the outlets 12 of the holes 6 are associated with the underside 10. In the plate 3 illustrated in FIG. 1b, all the holes 6 run parallel to the center axis 8 of the plate 3 and therefore have no inclination. In addition, the cross-sectional area of all the holes 6 is identical and does not change in the flow direction, i.e. from the inlet 11 to the outlet 12. The upper side 9 is formed by a plane in which the inlets 11 of the holes 6 lie. By comparison, the underside 10 is formed by a curved surface, in which the outlets 12 of the holes lie. The underside 10 is curved such that the holes 6, which lie in the vicinity of the center axis 8, are longer than the holes 6 which lie in the peripheral region of the plate 3. Circumferential chamfers 13 can be provided on the edges of the outlets 12.

Figure 1C:
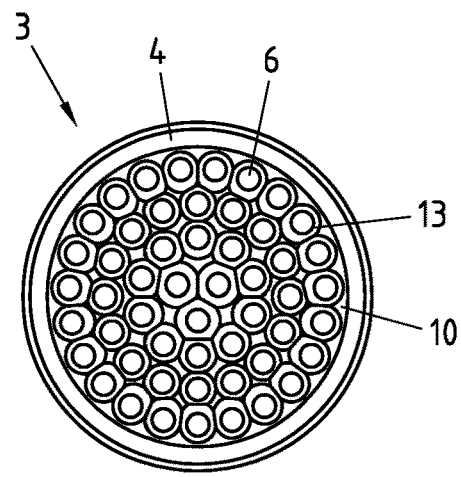

In FIG. 1c the plate 3 of the filling nozzle 1 of FIG. 1a is illustrated along the section plane Ic-Ic drawn in FIG. 1a, i.e. viewed from the underside. Also in FIG. 1c, the regions of the plate 3 already described in connection with FIG. 1a and FIG. 1b are given corresponding reference numbers. For reasons of better clarity, an illustration of the body 2 was dispensed with in FIG. 1c. FIG. 1c illustrates that a plurality of holes 6 are arranged closely adjacent to one another and occupy almost the entire area of the plate 3 here. The filling nozzle 1 illustrated in FIG. 1a, FIG. 1b and FIG. 1c largely corresponds to the filling nozzle known from EP 2 078 678 A1.

Figure 2:
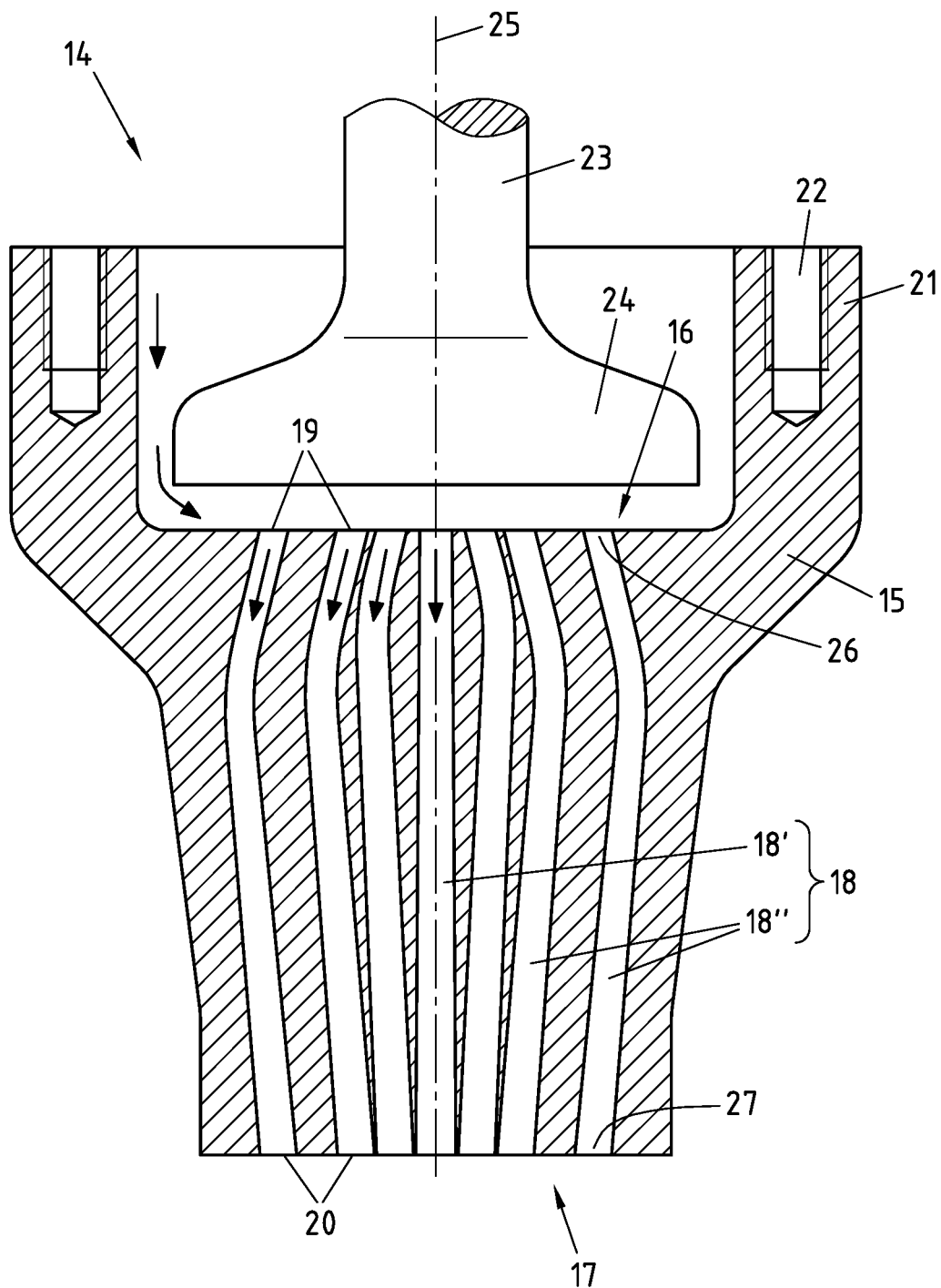

FIG. 2 shows a first embodiment of a device 14 according to the invention for altering the jet shape of pourable products, in cross-section. The device 14 has a housing 15 constructed in one piece, which comprises an entry region 16 for the entry of the pourable products and an exit region 17 for the exit of the pourable products. Between the entry region 16 and the exit region 17 a plurality of ducts 18 are arranged for the conveying of the pourable products in the housing 15. The ducts 18 have respectively an inlet 19 associated with the entry region 16 and an outlet 20 associated with the exit region 17. In the device 14 shown in FIG. 2, both the entry region 16—and therefore also the inlets 19—and also the exit region 17—and therefore also the outlets 20—are arranged in a plane, wherein the two planes lie parallel to one another. Finally, the device 14 has on its upper side a circumferential flange 21, into which several bores 22 are introduced. Via the bores 22, the device 14 can be connected for example with a filling machine.

In FIG. 2 furthermore a valve rod 23 with a sealing element 24 is illustrated. These components do not in fact belong to the device 14, but serve for explanation of their mode of operation. In order to interrupt the through-flow of the device 14—illustrated in FIG. 2 diagrammatically by arrows—the valve rod 23 is lowered, so that the sealing element 24 is pressed onto the entry region 16 and closes the inlets 19, which are arranged there, of the ducts 18. A center axis 25 runs centrally through the valve rod 23, the sealing element 24 and the device 14.

In the device 14, illustrated by way of example in FIG. 2, the ducts 18 can be divided into a central duct 18' and into several eccentric ducts 18". The center axis of the central duct 18' corresponds to the center axis 25 of the device; the central duct 18' therefore runs straight downwards and stands perpendicularly on the two planes of the entry region 16 and of the exit region 17. On the other hand, the center axes of the eccentric ducts 18"—and therefore also the eccentric ducts 18" themselves—run in a curved manner and are, in addition, partially inclined. In the device 14 shown by way of example in FIG. 2, all the eccentric ducts 18" are curved, wherein the curvature only extends over a partial region of the ducts 18" to which inclined, but not curved, regions adjoin.

The ducts 18 of the device 14 illustrated by way of example in FIG. 2 have a first cross-sectional area 26 and a second cross-sectional area 27, wherein the first cross-sectional area 26 is measured at the inlets 19 and wherein the second cross-sectional area 27 is measured at the outlets 20. The ducts 18 of the device 14 shown in FIG. 2 are distinguished in that the second cross-sectional area 27 of each duct 18 is greater than the first cross-sectional area 28 of this duct 18. This concerns both the central duct 18' and also the eccentric ducts 18". In other words, the cross-sectional area of the ducts 18 increases, viewed in the flow direction, from its inlets 19 to its outlets 20.

Figure 3:
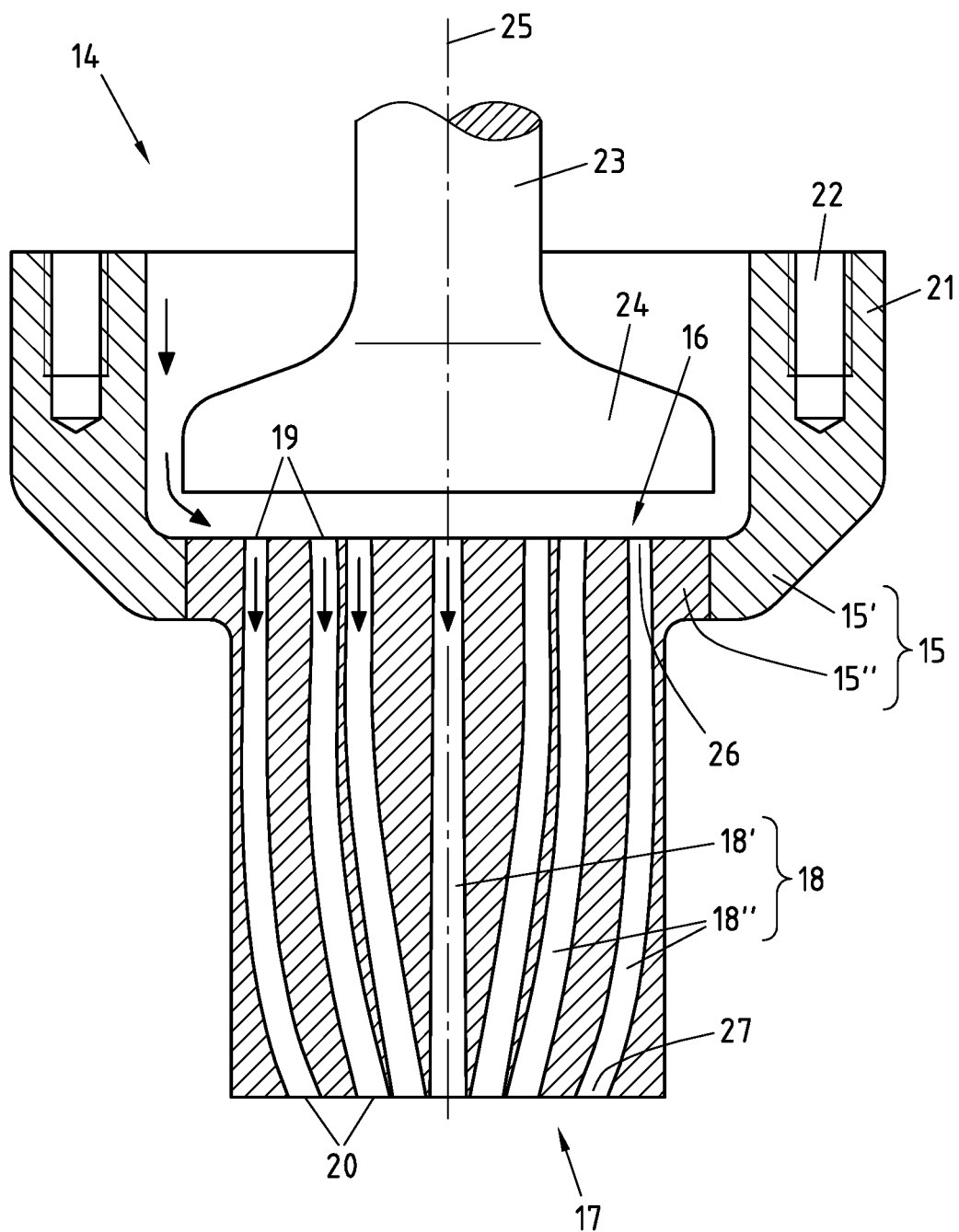

In FIG. 3 a second embodiment of a device 14 according to the invention for altering the jet shape of pourable products is illustrated in cross-section. The regions already described in connection with the first embodiment (FIG. 2) of the device 14 are given corresponding reference numbers in FIG. 3. The essential difference between the first and the second embodiment of the device 14 lies in that the housing 15 is constructed in two parts and comprises an upper housing part 15' and a lower housing part 15". The ducts 18 are arranged in the lower housing part 15", which is exchangeable. A further difference to the first embodiment (FIG. 2) of the device lies in a differently shaped curvature of the eccentric ducts 18". Some of the eccentric ducts 18" are curved continuously for example, i.e. along their entire length.

Figure 4:
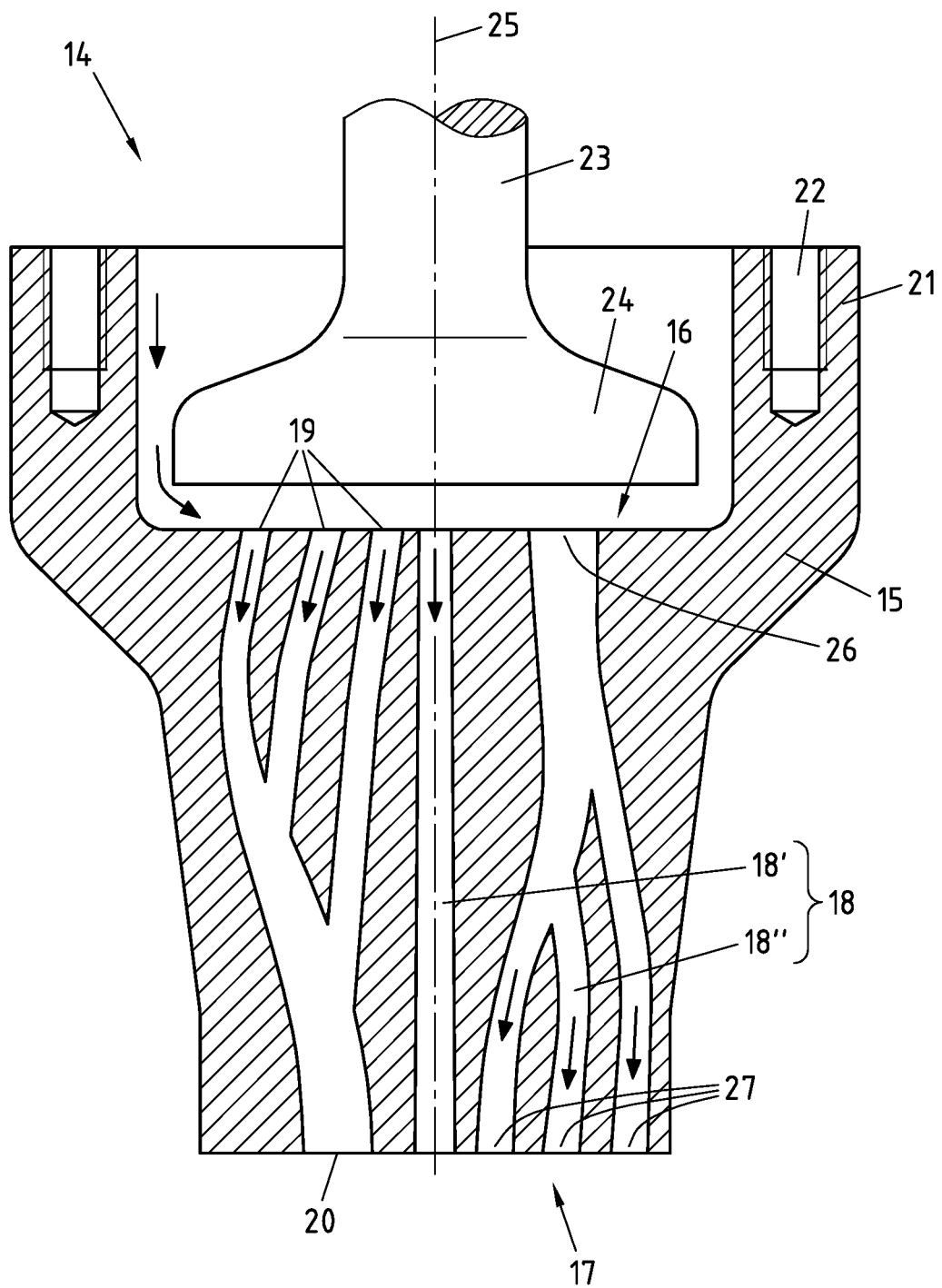

FIG. 4 shows a third embodiment of a device 14 according to the invention for altering the jet shape of pourable products, in cross-section. The regions already described in connection with the first embodiment (FIG. 2) and with the second embodiment (FIG. 3) of the device 14 are given corresponding reference numbers in FIG. 4. The essential difference between the third embodiment and the first two embodiments of the device 14 lies in that in the third embodiment the eccentric ducts 18" have branches.

The eccentric duct 18" illustrated to the right of the center axis 25 in FIG. 4 has only one inlet 19 with a first cross-sectional area 26. In the course of this duct 18", firstly a first arm branches off and subsequently a second arm, so that this duct 18" is divided into arms. Accordingly, the duct 18" illustrated to the right of the center axis 25 also has three outlets 20, which together form a second cross-sectional area 27. On the other hand, the duct 18" illustrated to the left of the center axis 25 in FIG. 4 has three inlets 19, which together form a first cross-sectional area 26. In the course of this duct 18", three arms of the duct 18" unite to a single arm. Accordingly, the duct 18" illustrated to the left of the center axis 25 also has only one outlet 20 with a second cross-sectional area 27. The central duct 18' can also be divided into several arms, differently from as illustrated in FIG. 4, or can arise from the uniting of several arms. Alternatively hereto, the central duct 18' can also be omitted.

Figure 5:
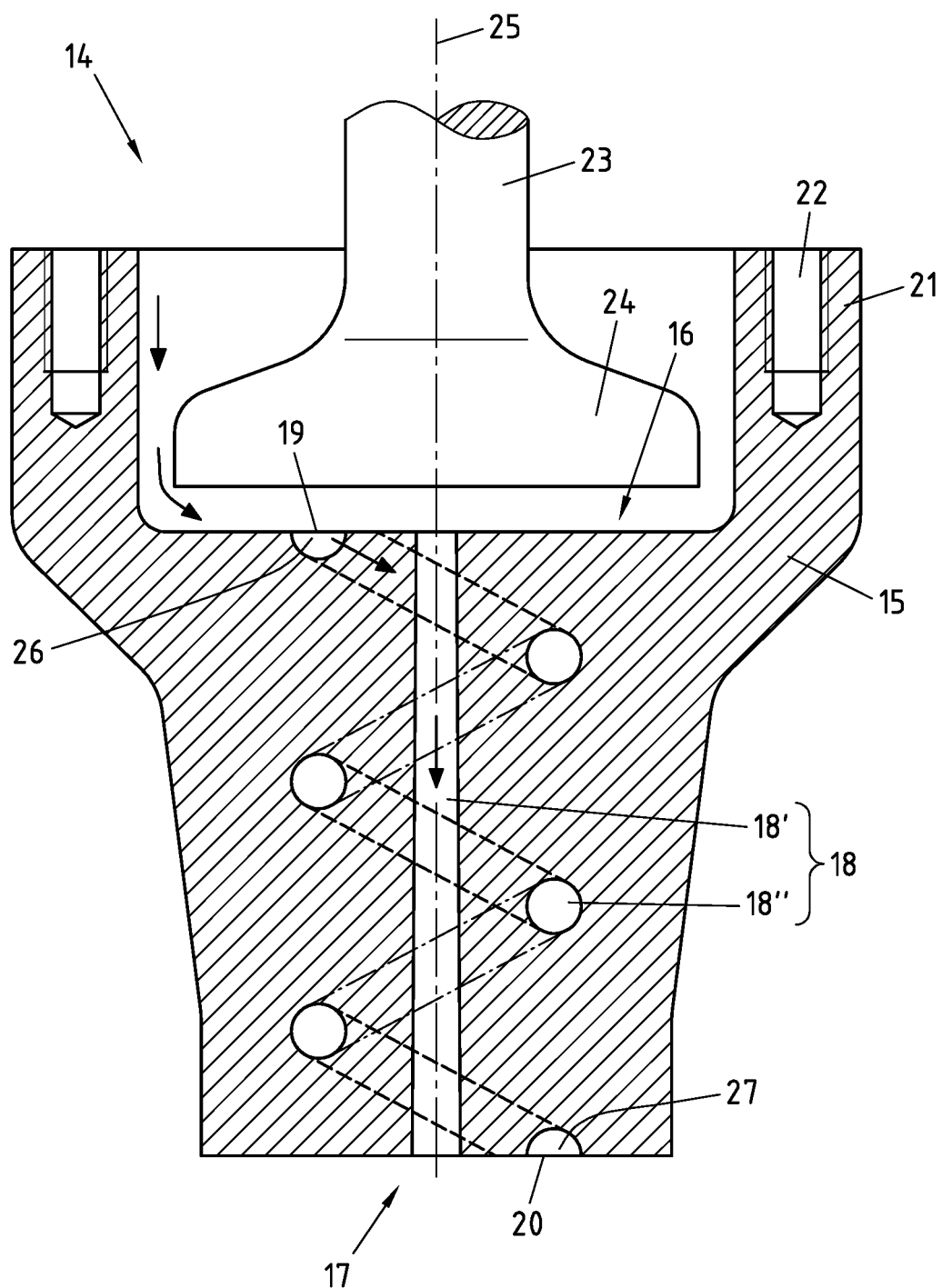

In FIG. 5 a fourth embodiment of a device 14 according to the invention for altering the jet shape of pourable products is illustrated, in cross-section. The regions already described in connection with the first (FIG. 2), second (FIG. 3) and third (FIG. 4) embodiment of the device 14 are given corresponding reference numbers in FIG. 5. The essential difference between the fourth embodiment and the first three embodiments of the device 14 lies in that in the fourth embodiment the eccentric duct 18" has a different configuration.

The eccentric duct 18" shown in FIG. 5 runs in a spiral shape around the center axis 25, without intersecting it. Therefore, the eccentric duct 18" also runs around the central duct 18' lying on the center axis 25. The eccentric duct 18" has no branches and therefore connects a single inlet 19 with a single outlet 20, wherein the inlet 19 has a first cross-sectional area 26 and wherein the outlet 20 has a second cross-sectional area 27. However, alternatively hereto, and differently to as illustrated in FIG. 5, the eccentric duct 18" can also be divided into several arms or can arise from the uniting of several arms. In addition, the eccentric duct 18" does not imperatively have to run around the center axis 25, but rather can also be arranged entirely adjacent to the center axis 25 and adjacent to the central duct 18'.

Figure 6:
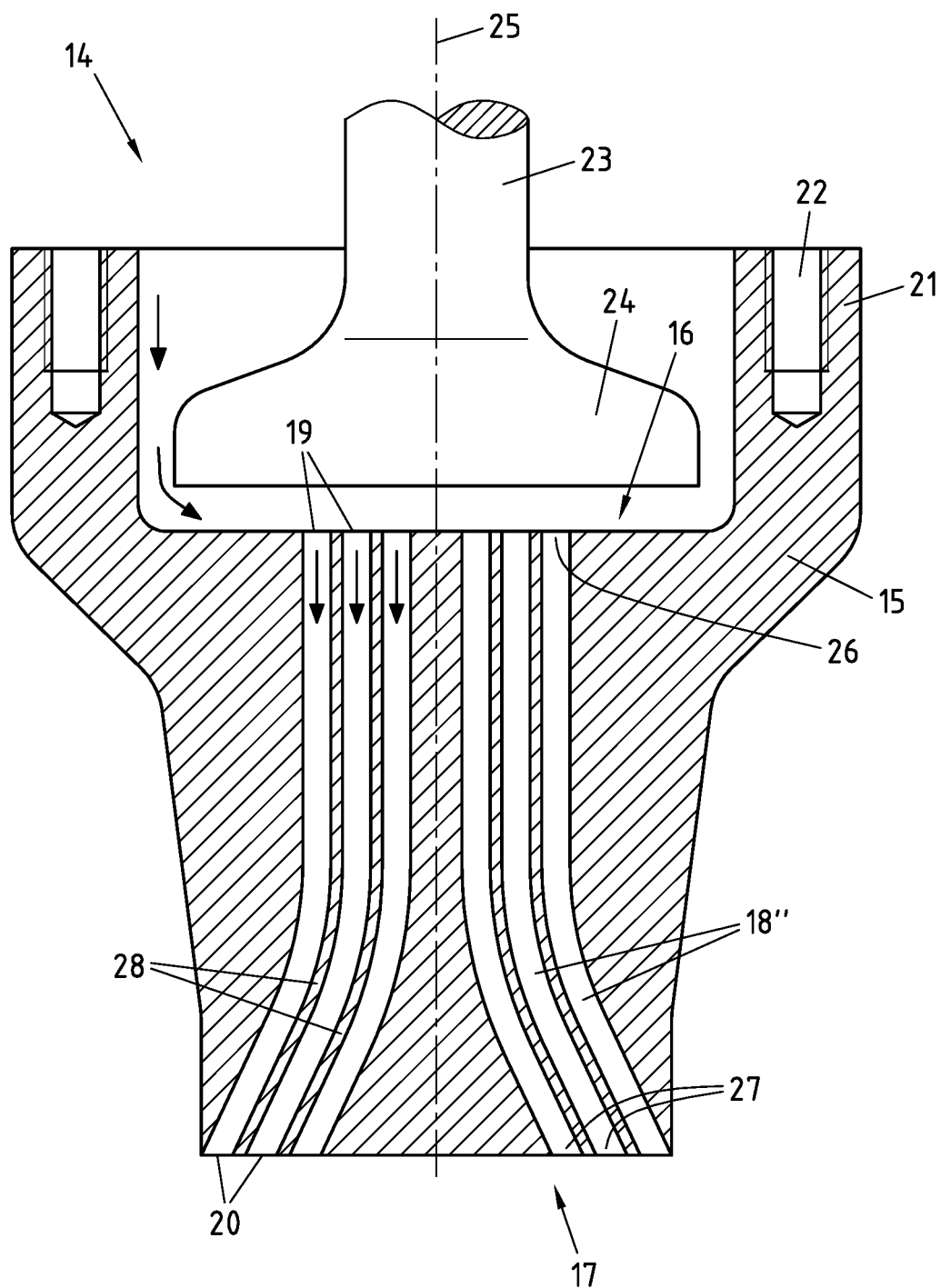

Finally, FIG. 6 shows a fifth embodiment of a device 14 according to the invention for altering the jet shape of pourable products. The regions already described in connection with the first (FIG. 2), second (FIG. 3), third (FIG. 4) and fourth (FIG. 5) embodiment of the device 14 are given corresponding reference numbers in FIG. 6. The essential difference between the fifth embodiment and the first four embodiments of the device 14 lies again in a different configuration of the ducts 18.

In the embodiment of the device 14 illustrated in FIG. 6, solely eccentric ducts 18" are present; on the other hand, a central duct 18' is not present. All the eccentric ducts 18" are curved outwards and therefore direct the partial flows flowing through them away from the center axis 25. The eccentric ducts 18" can be divided into two groups. The group illustrated on the left in FIG. 6 comprises three eccentric ducts 18" running parallel, which are separated from one another by thin dividing walls 28 with a constant wall thickness and which direct towards the left the partial flows flowing through them. The group illustrated on the right in FIG. 6 comprises three eccentric ducts 18" running parallel, which are separated from one another by thin dividing walls 28 with a constant wall thickness and direct towards the right the partial flows flowing through them. The thickness of the dividing walls 28 can lie in the range between 0.2 mm and 8.5 mm. Preferably, the partial flows emerging from the two groups of eccentric ducts 18" do not touch one another, so that the configuration of the device 14 illustrated in FIG. 6 is a "side emitter". Alternatively hereto, the eccentric ducts 18" could be arranged such that a jet with a closed cross-section, running around the center axis 25, emerges from the device 14.

The features of the device 14, which were previously described in detail in connection with their first to fifth embodiment (FIG. 2 to FIG. 6), can be combined with one another in multiple ways. In particular, the type of housing 15 (one-piece or respectively multi-part) and the number and the shape of the ducts 18 (straight, curved, inclined, branched, spiral) can be combined with one another.

LIST OF REFERENCE NUMBERS

1: filling nozzle
2: body
3: plate
4: flange
5: projection
6: hole
7: jet
8: centre axis
9: upper side
10: underside
11: inlet
12: outlet
13: chamfer
14: device
15,15',15": housing
16: entry region
17: exit region
18,18', 18": duct
19: inlet
20: outlet
21: flange
22: bore
23: valve rod
24: sealing element
25: centre axis
26: first cross-sectional area
27: second cross-sectional area
28: dividing wall

The invention claimed is:

1. A method for the filling of pourable products with a device, comprising:
  providing the device for altering a jet shape of the pourable products, the device comprising:
    an entry region for an entry of the pourable products,
    an exit region for an exit of the pourable products, and
    several ducts for conveying the pourable products,
    wherein each duct has at least one inlet associated with the entry region and at least one outlet associated with the exit region,
    wherein at least one of the ducts is curved, at least in sections, and
    wherein wall surfaces of the ducts are constructed in one piece,
    wherein the device has a housing that is constructed in one piece and produced by an additive manufacturing method, wherein portions of the housing extend between the respective ducts so that no gaps are formed between the ducts,
  inserting the pourable products into the entry region; and
  conveying the pourable products through the several ducts and the exit region.

2. The method of claim 1, wherein the filling of foodstuffs is aseptic.

3. A method for a production of a device, comprising the following step:
  a) producing the device with the ducts arranged therein by an additive manufacturing method,
  wherein the device comprises:
    an entry region for an entry of pourable products,
    an exit region for an exit of the pourable products, and
    several ducts for conveying the pourable products,
    wherein each duct has at least one inlet associated with the entry region and at least one outlet associated with the exit region, wherein at least one of the ducts is curved, at least in sections, and wherein wall surfaces of the ducts are constructed in one piece, wherein the device has a housing that is constructed in one piece which is produced by the additive manufacturing method, wherein portions of the housing extend between the respective ducts so that no gaps are formed between the ducts.

4. The method according to claim 3, wherein step a) takes place by sintering or melting.

5. The method according to claim 3, wherein step a) takes place by laser sintering or laser melting.

* * * * *